United States Patent [19]
Wertz

[11] Patent Number: 6,060,528
[45] Date of Patent: *May 9, 2000

[54] PROCESS FOR CONVERTING TIRES TO RUBBER PARTICLES WHILE REMOVING INORGANIC COMPOUNDS FROM THE TIRES

[75] Inventor: David L. Wertz, Hattiesburg, Miss.

[73] Assignee: University of Southern Mississippi, Hattiesburg, Miss.

[*] Notice: This patent is subject to a terminal disclaimer.

[21] Appl. No.: 09/174,996

[22] Filed: Oct. 19, 1998

Related U.S. Application Data

[62] Division of application No. 08/837,443, Apr. 17, 1997, Pat. No. 5,889,063.

[51] Int. Cl.⁷ ..................................................... C08J 11/04
[52] U.S. Cl. ................................................................ 521/41
[58] Field of Search ............................... 521/40, 40.5, 41

[56] References Cited

U.S. PATENT DOCUMENTS 4,182,677  1/1980  Bocard et al. ............................ 210/36

OTHER PUBLICATIONS

Bauman, Bernard D., "High–Value Engineering Materials from Scrap Rubber", Rubber World, May 1995, pp. 30–33.

Tsaikova, S., et al., "Oxidation of Scarp Tire Vulcanizates by Nitric Acid", Journal of Applied Chemistry of the USSR, May 1986, pp. 2409–2411.

Cummings, Ricky C., et al., X–ray Characterization of Tire Derived Particles Resulting From Different Solvents, American Chemical Society, Division of Fuel Chemistry, vol. 40, No. 4, Aug. 1995, pp. 879–883.

*Primary Examiner*—Paul R. Michl
*Attorney, Agent, or Firm*—Arnold White & Durkee

[57] ABSTRACT

Tires are converted to rubber particles and inorganic compounds are removed from the tires by treating the tires in a closed reactor with a nitric acid solution having a nitric acid concentration above 60%. In the preferred embodiment, any steel belts contained in the tires are first removed. The tires are then treated with a solution of concentrated nitric acid in which the acid concentration is maintained above 60% which extracts inorganic compounds such as zinc, sulfur and calcium from the tires and converts the tires into rubber particles.

13 Claims, 2 Drawing Sheets

PROCESS FOR CONVERTING TIRES TO RUBBER PARTICLES WHILE REMOVING INORGANIC COMPOUNDS FROM THE TIRES

This is a Division of application Ser. No. 08/837,443, filed Apr. 17, 1997, now U.S. Pat. No. 5,889,063.

BACKGROUND OF THE INVENTION

The present invention relates to processes for recycling scrap tires. More particularly the present invention relates to processes for treating scrap tires to remove inorganic components, steel belts and to convert the tires to rubber particles.

Currently, about 200 million scrap tires are being stockpiled, landfilled or illegally dumped annually with about 50 million scrap tires being recycled in a variety of ways. The current disposal methods are causing numerous short term environmental problems. For example, whole tires occupy large amounts of space and may "float" or rise to the top of landfills. In an attempt to prevent floating, many landfills require that scrap tires be shredded, a process which is energy intensive and wasteful if it does not produce any useful product.

Scrap tire stockpiles produce health risks by providing a place for rodents and mosquitoes to breed which facilitates the spreading of diseases. Large fires have also broken out in scrap tire stockpiles causing many problems. These fires are long lasting and are difficult to extinguish, unnecessarily tying up fire fighting resources. Additionally, these fires produce unwanted smoke which pollutes the environment and toxic oils which poison adjacent soils and water.

Accordingly, numerous attempts have been made to develop processes to use or recycle scrap tires.

Scrap tires often contain several inorganic components such as zinc, sulfur and calcium which are impregnated into the rubbery portion of the tire. These inorganic components can be a hindrance to the recycling of the rubbery portion of the tires using various processes. For example, their removal is necessary when the tires are to be combusted in a conventional boiler since the inorganic components will cause air pollution and/or boiler scale build-up as well as interfering with various catalytic processes.

Many tires also include steel belts and bead wires for added strength and support. These belts and wires also must be removed from the scrap tires in order to permit effective recycling and use of the rubbery portion of the tire.

Accordingly, it would be a significant advancement in the art to provide a process for removing steel belts and other inorganic components from scrap tires to permit more effective recycling of the rubbery portion of the tires. It would be a further advancement to provide a process that converted tires into small particles for subsequent use. Such a process is disclosed and claimed herein.

BRIEF SUMMARY OF THE INVENTION

The present invention provides a novel process for removing inorganic components and steel belts from scrap tires while converting the tires to particulates. In a preferred embodiment, whole tires and/or tire pieces are mixed with a nitric acid solution in which the nitric acid concentration is maintained above 60% in a closed adiabatic system to cleave the bonding that adheres rubbery polymer in the tire pieces to any steel belts that are contained in the tires. These steel belts can then be removed by any suitable means such as with a magnet.

The rubbery tire pieces are then further processed with a nitric acid solution with a nitric acid concentration above 60% in a closed adiabatic system to extract inorganic compounds embedded within the rubber. After the rubbery components have soaked for a sufficient time such that the inorganic components have been extracted, the rubber pieces are separated from the nitric acid solution by filtration. The filtrate is then washed, dried and powdered.

This process removes inorganic components such as zinc, sulfur and calcium from the tires, allows recovery of the steel belts and converts the tires to rubber particles which can be used for other purposes.

In the preferred embodiment, the nitric acid concentration in the processing solutions is monitored and maintained above 60% by the addition of gaseous nitrogen dioxide and oxygen.

DETAILED DESCRIPTION OF THE PREFERRED EMBODIMENTS

The present invention provides a novel process for converting scrap tires to particulates while removing steel belts and unwanted inorganic components to leave a rubber composition which can more easily be recycled. The invention is best understood by reference to the attached drawings.

Figure 1:
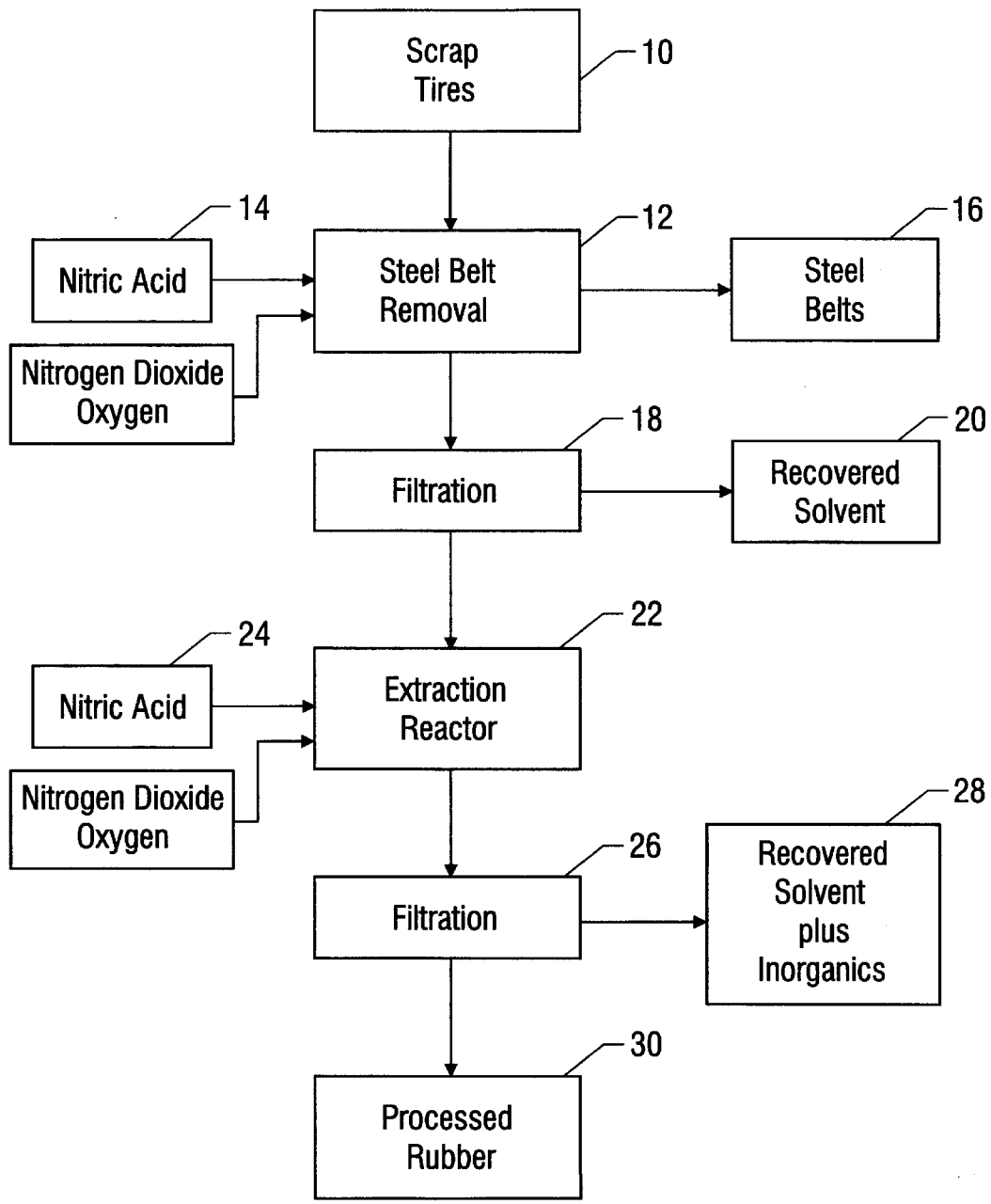
FIG. 1 is a schematic flow diagram illustrating a preferred embodiment of the process of the present invention.

Reference is made to FIG. 1 which schematically illustrates a preferred embodiment of the process of the present invention. Scrap tires 10 are preferably prepared for processing by removing dirt and foreign materials. The tires can be treated whole or they can be shredded or cut into smaller pieces to facilitate processing in the processes of the present invention.

In a preferred embodiment, the scrap tire pieces are first subjected to a process 12 for steel belt removal. The tires are mixed in a closed adiabatic system with a concentrated nitric acid solution 14 having an acid concentration greater than 60% which cleaves the bonding that adheres the rubbery polymer of the tire pieces to the steel belts. In one embodiment, the nitric acid solution begins with an acid concentration of about 70%. After the tires have soaked in the nitric acid solution for a sufficient length of time to cleave the bonds, the steel belts 16 can be removed by a magnet or other suitable means. In the preferred embodiment, the tires are soaked in the nitric acid solution at ambient temperature. At about 22° C., it takes about 1½ to 3 days to separate the steel belts from the tire particles.

In most steel belted tires, the belts are connected to the rubber by a copper-sulfur bond. The $NO_3^-(aq)$ ion attacks and cleaves this bond, thus separating the steel belts from the rubber. Thus, it is important to maintain a high nitric acid concentration in the solution.

The nitric acid concentration of the solution is maintained above 60% during this process by the addition of gaseous nitrogen dioxide and oxygen. The oxygen can be added to the closed system either as air or pure oxygen. The specific gravity of the solution is monitored and the nitrogen dioxide and oxygen are added to the vapor phase as needed. A 60% nitric acid solution has a specific gravity of about 1.37 g/cc.

The nitrogen dioxide and oxygen gases react in solution to replenish the $HNO_3(aq)$ and $NO_3^-(aq)$ by the following reactions:

$$4NO_2(g)+O_2(g)\rightarrow 2N_2O_5(g)$$

$$N_2O_5(g)+H_2O\rightarrow 2HNO_3(aq)$$

$$HNO_3(aq)\rightarrow H^+(aq)+NO_3^-(aq)$$

It is the balance of the solution phase species $HNO_3$ and $NO_3^-$ at very low pH that is important to the process of the present invention.

While the above described process is the preferred method to remove the steel belts from the scrap tires, other processes can also be used. For example, the steel belts can be mechanically removed. Also, sulfuric acid and hydrogen peroxide solutions can be used to separate the belts from the rubber particles.

The rubber pieces remaining after steel belt removal are introduced into a closed extraction reactor 22 where they are mixed with a nitric acid solution 24 having a nitric acid concentration above 60% to remove inorganic components embedded within the rubber pieces. The nitric acid solution degrades the tire pieces into particles and dissolves the inorganic components such as zinc, sulfur and calcium contained therein. The process is preferably performed adiabatically. It will be appreciated that when nitric acid is used both as the solvent for steel belt removal and for inorganic extraction, it is not necessary to remove the nitric acid by filtration step 18. Rather, the steel belt removal and inorganic extraction can take place in the same reactor.

The rubber pieces are soaked in the nitric acid solution for about 4–5 days at ambient temperature to remove the inorganics. During this time, the specific gravity of the solution is monitored and gaseous nitrogen dioxide and oxygen are added as necessary to maintain the nitric acid concentration above 60%. If nitric acid is used to remove the steel belts that treatment time is included in the total treatment time to remove the inorganics.

Sulfur in the tires is removed by the following reaction in which R represents the rubber:

$$R-S+8H^+(aq)+8NO_3^-(aq)\rightarrow R+SO_4^{-2}(aq)+8NO_2(g)+4H_2O$$

This results in a very large production of $NO_2(g)$. Accordingly, in order to maintain the $NO_3^-$ (aq) concentration at a high enough level in the solution, oxygen must be added to the system. In the preferred embodiment this is accomplished by adding air to the vapor phase of the closed system.

After the inorganics have been extracted from the rubber, the solvent 28 which includes the inorganic compounds is separated from the rubber particles 30 by a suitable filtration step 26.

If nitric acid is used to cleave the bonds holding the steel belts, the same solution can be used for that process as well as the process for the extraction of the inorganics. It is, however, preferred to remove the steel belts as soon as they can be separated to conserve the nitric acid which would otherwise be consumed in dissolving the belts.

The processed rubber 30 forms a pulpy material which can easily be washed, dried and ground into particles. These particles can be recycled through a number of different processes. For example, since they are basically carbon and hydrogen and have a high heat content, they are an excellent pollutant-free fuel source producing a heat value of about 32 Joules/gram. They can be used in particle form or can be compressed into pellets using standard processes.

They can also be mixed with other fuels such as rice hulls, municipal garbage or low rank coals to produce synthetic blends that are useful as fuels. In one preferred embodiment, the processed rubber particles are mixed with sawdust and/or wood chips to form a fuel having about the same specific heat as bituminous coal. Such a mixture produces significantly less sulfur dioxide in the effluent and significantly less ash than typical coal.

The rubber particles produced by the process of the present invention can be used to extract some metal ions and some anions from water. For example, the rubber particles can be used to remove Cd(II) and $Cl^-$ from a solution containing $CdCl_2$.

Figure 2:
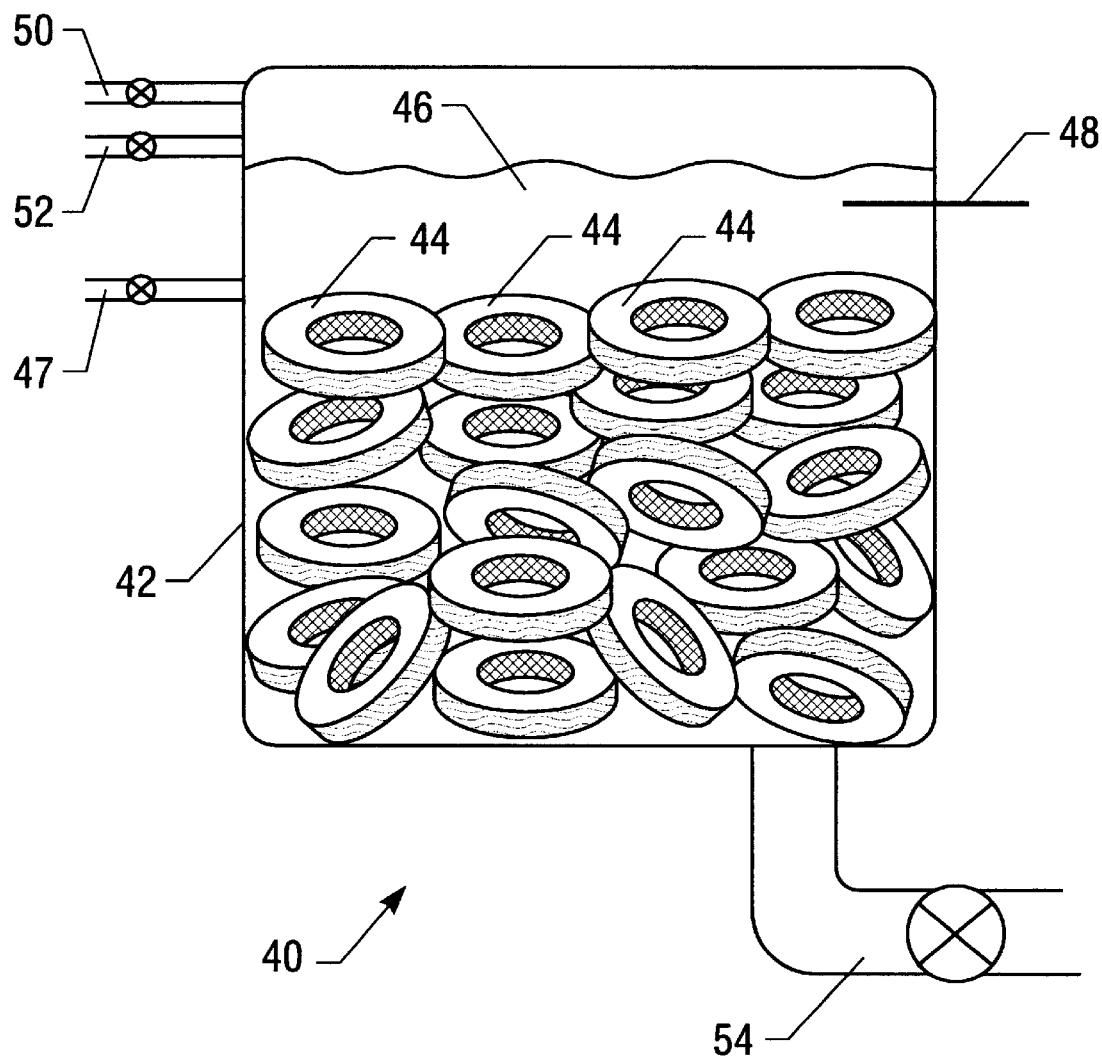
FIG. 2 is a schematic illustration of a reactor useful in a preferred embodiment of the process of the present invention.

Reference is next made to FIG. 2 which schematically illustrates a closed reactor 40 which can be used in the process of the present invention. Reactor 40 includes a tank 42 into which a plurality of tires 44 can be placed. Tank 42 is then filled with a solution of nitric acid 46 through inlet 47 above the level of the tires 44.

A probe 48 is used to monitor the specific gravity of solution 46. Gaseous nitrogen dioxide and oxygen are added to the vapor phase above solution 46 through inlets 50 and 52 as needed to maintain the nitric acid concentration above about 60% in solution 46.

After an initial processing period, the steel belts can be removed from tank 42. After complete processing, the nitric acid solution 46 and the rubber particles from tires 44 can be removed through outlet 54. The rubber can then be filtered out, washed, dried and further processed. The nitric acid solution can be recycled or processed for disposal.

EXAMPLE 1

Tires containing steel belts are immersed in a solution of nitric acid in a closed reactor at room temperature and are allowed to soak for about 36 hours. The specific gravity of the solution is monitored and the concentration of nitric acid in the solution is maintained above 60% by the addition of gaseous nitrogen dioxide and oxygen (added as air) to the vapor phase in the reactor as needed. The tires are then removed from the solution and the steel belts are removed with the application of some mechanical force.

The tires are again immersed in a solution of nitric acid in a closed reactor at room temperature and are allowed to soak for three additional days. Again, the nitric acid concentration is maintained above 60%. At this time the tires have broken down into particles and they are removed from the solution by filtration. Analysis of the rubber particles shows that substantially all of the sulfur, calcium and zinc have been removed from the rubber particles.

EXAMPLE 2

Tires containing steel belts are immersed in a solution of concentrated nitric acid in a closed reactor and are allowed to soak at room temperature. The concentration of the nitric acid is maintained above 60% by the addition of gaseous nitrogen dioxide and oxygen as needed. After about 72 hours, the steel belts in the tires are completely separated from the rubber particles and can be removed with a magnet or by other means. The rubber particles are allowed to continue soaking in the nitric acid for about 2 additional days. The particles are then separated from the solution by filtration. Analysis shows that substantially all of the sulfur, calcium and zinc have been removed from the rubber particles.

While the invention has been described with respect to the presently preferred embodiments, it will be appreciated by those skilled in the art that it can be embodied in other forms without departing from its spirit or essential characteristics. For example, other processes for removing the steel belts can also be utilized. Additionally, the length of time the tires are allowed to soak can be increased or decreased as necessary to remove the steel belts and inorganic compounds present in the particular tires being processed. Accordingly, all modifications or changes which come within the meaning and range of equivalency of the claims are to be embraced within their scope.

What is claimed is:

1. A process for removing inorganic compounds from scrap tires comprising:

dividing the scrap tires into a plurality of small pieces;

removing steel belts from said pieces of tires;

mixing said tire pieces in a closed reactor with a nitric acid solution having a nitric acid concentration above 60% for a sufficient time to extract inorganic compounds from rubber particles forming said tire pieces;

maintaining the concentration of the nitric acid above 60% by the addition of nitrogen dioxide; and separating the solution and extracted inorganic compounds from the rubber particles.

2. A process for removing inorganic compounds from scrap tires as defined in claim 1 wherein the oxygen is added as air.

3. A process for removing inorganic compounds from scrap tires as defined in claim 1 wherein said removing step comprises mixing the tires with a nitric acid solution in which the nitric acid concentration is maintained above 60%.

4. A process for removing inorganic compounds from scrap tires as defined in claim 3 wherein said removing step further comprises collecting the steel belts with a magnet.

5. A process for removing inorganic compounds from scrap tires as defined in claim 1 wherein the maintaining step comprises monitoring the specific gravity of the nitric acid solution.

6. A process for removing inorganic compounds from scrap tires as defined in claim 4 wherein the rubber particles are separated from the nitric acid solution by filtration.

7. A process for removing inorganic compounds from scrap tires comprising:

mixing tires in a closed reactor with a nitric acid solution having a nitric acid concentration above 60% for a sufficient time to separate steel belts in said tires from rubber in said tires;

maintaining the concentration of nitric acid above 60%;

removing the steel belts;

soaking the rubber from said tires in said nitric acid solution in said closed reactor for an additional length of time sufficient to remove inorganic compounds from said rubber while maintaining the concentration of nitric acid above 60% by the addition of nitrogen dioxide; and separating the rubber from the nitric acid solution and extracted inorganic compounds.

8. A process for removing inorganic compounds from scrap tires as defined in claim 7 further comprising adding oxygen to maintain the concentration of nitric acid above 60%.

9. A process for removing inorganic compounds from scrap tires as defined in claim 1 further comprising adding oxygen to maintain the concentration of the nitric acid above 60%.

10. A process for converting scrap tires to rubber particles comprising:

mixing tires in a closed reactor with a nitric acid solution having a nitric acid concentration above 60% for a time sufficient to extract inorganic compounds from said tire pieces and to break said tire pieces into rubber particles;

maintaining the concentration of nitric acid above 60% by the addition of gaseous oxygen;

separating the solution and extracted inorganic compounds from the rubber particles.

11. A process for converting scrap tires to rubber particles as defined in claim 10, wherein the maintaining step further comprises adding nitrogen dioxide.

12. A process for converting scrap tires to rubber particles as defined in claim 10, further comprising removing any steel belts from the tire pieces prior to mixing the tire pieces with the nitric acid solution.

13. A process for converting scrap tires to rubber particles as defined in claim 12, wherein the removing step comprising mixing the tire pieces with a nitric acid solution to cleave the bonding that adheres the rubber particles of the tire pieces to the steel belts.

* * * * *